(12) United States Patent
Motoyoshi

(10) Patent No.: US 10,189,164 B2
(45) Date of Patent: Jan. 29, 2019

(54) ROBOT, CONTROL DEVICE, AND ROBOT SYSTEM

(71) Applicant: Seiko Epson Corporation, Tokyo (JP)

(72) Inventor: Masaki Motoyoshi, Azumino (JP)

(73) Assignee: Seiko Epson Corporation (JP)

( * ) Notice: Subject to any disclaimer, the term of this patent is extended or adjusted under 35 U.S.C. 154(b) by 161 days.

(21) Appl. No.: 15/267,478

(22) Filed: Sep. 16, 2016

(65) Prior Publication Data

US 2017/0080577 A1    Mar. 23, 2017

(30) Foreign Application Priority Data

Sep. 17, 2015  (JP) ................................. 2015-183744

(51) Int. Cl.
  *B25J 9/16*    (2006.01)
  *B25J 13/08*   (2006.01)
  *B25J 9/00*    (2006.01)

(52) U.S. Cl.
  CPC ........... *B25J 13/088* (2013.01); *B25J 9/0018* (2013.01)

(58) Field of Classification Search
  CPC ...... B25J 13/088; B25J 9/1602; B25J 9/1682; B25J 9/1694; B25J 13/085; G05B 11/00; G05B 19/4181; G05B 19/4185; Y10S 901/09
  USPC ...... 700/245, 169, 248, 249, 258; 318/568.1
  See application file for complete search history.

(56) References Cited

U.S. PATENT DOCUMENTS

| | | | |
|---|---|---|---|
| 9,174,340 B2 * | 11/2015 | Takemoto | B25J 9/1674 |
| 2015/0127147 A1 * | 5/2015 | Yamazaki | B25J 13/088 700/248 |
| 2017/0291298 A1 * | 10/2017 | Saitou | B25J 9/12 |

FOREIGN PATENT DOCUMENTS

JP    2004-070422 A    3/2004

* cited by examiner

*Primary Examiner* — Dalena Tran
(74) *Attorney, Agent, or Firm* — Harness, Dickey & Pierce, P.L.C.

(57) ABSTRACT

A robot includes n arms, n drive units that respectively drive the n arms, n position detecting units that respectively detect positions of the n arms, and L signal lines through which signals detected by the n position detecting units flow. When the number of control units that control the driving of the drive units based on the signals detected by the position detecting units is m, the robot satisfies the relations of 2≤L<n and 2≤m<n.

4 Claims, 11 Drawing Sheets

ROBOT, CONTROL DEVICE, AND ROBOT SYSTEM

BACKGROUND

1. Technical Field

The present invention relates to a robot, a control device, and a robot system.

2. Related Art

In the related art, a robot including a robot arm is known. The robot arm includes a plurality of arms (arm members) coupled with one another through joint portions, in which, for example, a hand is attached as an end effector to the arm on the distal-most end side (the downstream-most side). The joint portions are driven by motors, and the arm rotates by the driving of the joint portion. Then, the robot grips, for example, an object with the hand, moves the object to a predetermined place, and performs predetermined work such as assembly.

Moreover, each of the motors is provided with an encoder that detects the rotation angle of the motor. A dedicated signal line is connected to each of the encoders, and the signal lines are connected to a control device that controls the robot.

JP-A-2004-70422 discloses, in a control device that controls a robot, to use multidrop connected encoders connected with one signal line common to the encoders. In the control device disclosed in JP-A-2004-70422, the number of motors and the number of control units (servos) that control the driving of the motors are set to be the same.

In the related-art robot, however, since the number of encoders and the number of signal lines are the same and the number of signal lines is large, the robot arm becomes thick. Due to this, work in a narrow space is difficult.

Moreover, in the control device disclosed in JP-A-2004-70422, since one signal line common to the encoders is connected thereto, the time required to transmit all of signals detected by the encoders is lengthened, thereby causing wasted waiting time in the control units. Due to this, the control of the robot is delayed.

Moreover, in the control device disclosed in JP-A-2004-70422, since the number of motors and the number of control units are the same and the number of control units is large, a circuit board of the control device is large, thereby increasing the size of the control device.

SUMMARY

An advantage of some aspects of the invention is to solve at least a part of the problems described above, and the invention can be implemented as the following aspects or application examples.

A robot according to an aspect of the invention includes: n arms; n drive units that respectively drive the n arms; n position detecting units that respectively detect positions of the n arms; and L signal lines through which signals detected by the n position detecting units flow, wherein when the number of control units that control the driving of the drive units based on the signals detected by the position detecting units is m, the robot satisfies the relations of $2 \leq L < n$ and $2 \leq m < n$.

With this configuration, since $L < n$, the number of signal lines is reduced, the arm can be made thin, and thus work in a narrow space can be easily performed.

Moreover, since $2 \leq L$, the time required to transmit all of the signals detected by the position detecting units can be shortened. With this configuration, the time (control cycle) taken to make one round of control of the drive units can be shortened, and thus the control of the robot can be quickly performed.

Moreover, since $m < n$, the number of control units is reduced, a circuit board of a control device can be made small, and the control device can be reduced in size.

In the robot according to the aspect of the invention, it is preferable that the n arms include a first arm rotatable around a first rotating axis, a second arm rotatable around a second rotating axis, and a third arm rotatable around a third rotating axis, that the n drive units include a first drive unit that drives the first arm, a second drive unit that drives the second arm, and a third drive unit that drives the third arm, that the n position detecting units include a first position detecting unit that detects a position of the first arm, a second position detecting unit that detects a position of the second arm, and a third position detecting unit that detects a position of the third arm, that the L signal lines include a first signal line and a second signal line, that the m control units include a first control unit and a second control unit, that a signal detected by the first position detecting unit and a signal detected by the second position detecting unit flow through the first signal line, that a signal detected by the third position detecting unit flows through the second signal line, that the first control unit controls the driving of the first drive unit based on the signal detected by the first position detecting unit, and controls the driving of the third drive unit based on the signal detected by the third position detecting unit, and that the second control unit controls the driving of the second drive unit based on the signal detected by the second position detecting unit.

With this configuration, the time (control cycle) taken to make one round of control of the drive units can be further shortened, and thus the control of the robot can be more quickly performed.

In the robot according to the aspect of the invention, it is preferable that the first control unit and the second control unit are connected in parallel.

With this configuration, the first control unit and the second control unit can perform in parallel similar processes.

In the robot according to the aspect of the invention, it is preferable that in the case where the m control units are compared, when attention is paid to one common signal line in each of the L signal lines, a difference between a maximum value and a minimum value of the number of the drive units that the control unit controls based on the signal flowing through the common signal line is 1 or less.

With this configuration, the time (control cycle) taken to make one round of control of the drive units can be further shortened, and thus the control of the robot can be more quickly performed.

In the robot according to the aspect of the invention, it is preferable that the L, the m, and the n are 2, 3, and 6, respectively.

With this configuration, since the number of arms is six, various motions can be performed.

A control device according to another aspect of the invention controls the robot according to the aspect of the invention, and includes the m control units.

With this configuration, since $L < n$, the number of signal lines is reduced, the arm can be made thin, and thus work in a narrow space can be easily performed.

Moreover, since $2 \leq L$, the time required to transmit all of the signals detected by the position detecting units can be shortened. With this configuration, the time (control cycle)

taken to make one round of control of the drive units can be shortened, and thus the control of the robot can be quickly performed.

Moreover, since m<n, the number of control units is reduced, a circuit board of the control device can be made small, and the control device can be reduced in size.

A robot system according to still another aspect of the invention includes: the robot according to the aspect of the invention; and a control device that includes the m control units and controls the robot.

With this configuration, since L<n, the number of signal lines is reduced, the arm can be made thin, and thus work in a narrow space can be easily performed.

Moreover, since 2≤L, the time required to transmit all of the signals detected by the position detecting units can be shortened. With this configuration, the time (control cycle) taken to make one round of control of the drive units can be shortened, and thus the control of the robot can be quickly performed.

Moreover, since m<n, the number of control units is reduced, a circuit board of the control device can be made small, and the control device can be reduced in size.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot, a control device, and a robot system according to the invention will be described in detail based on preferred embodiments shown in the accompanying drawings.

First Embodiment

Figure 1:
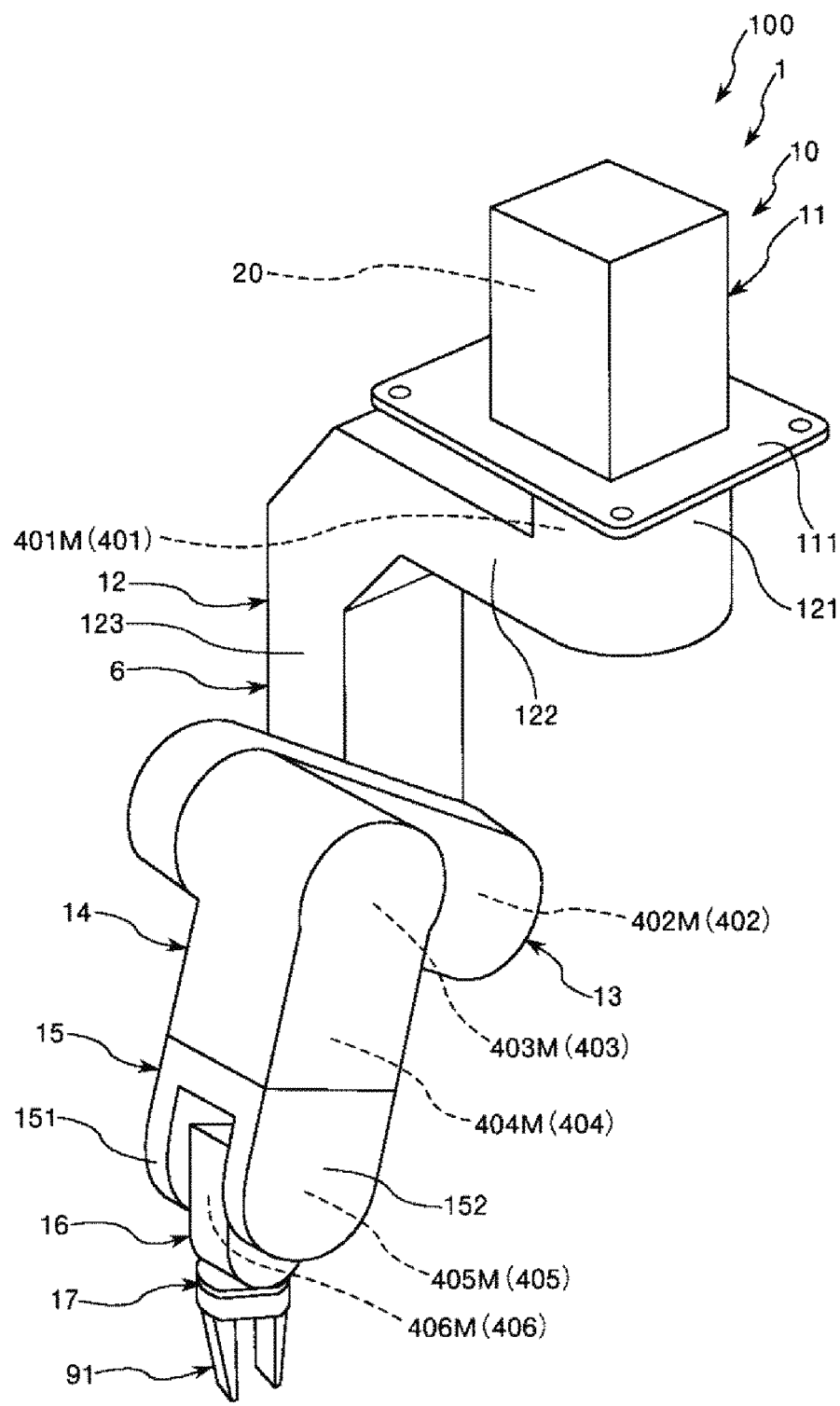
FIG. 1 is a perspective view showing a first embodiment of a robot system (robot) according to the invention.
Figure 2:
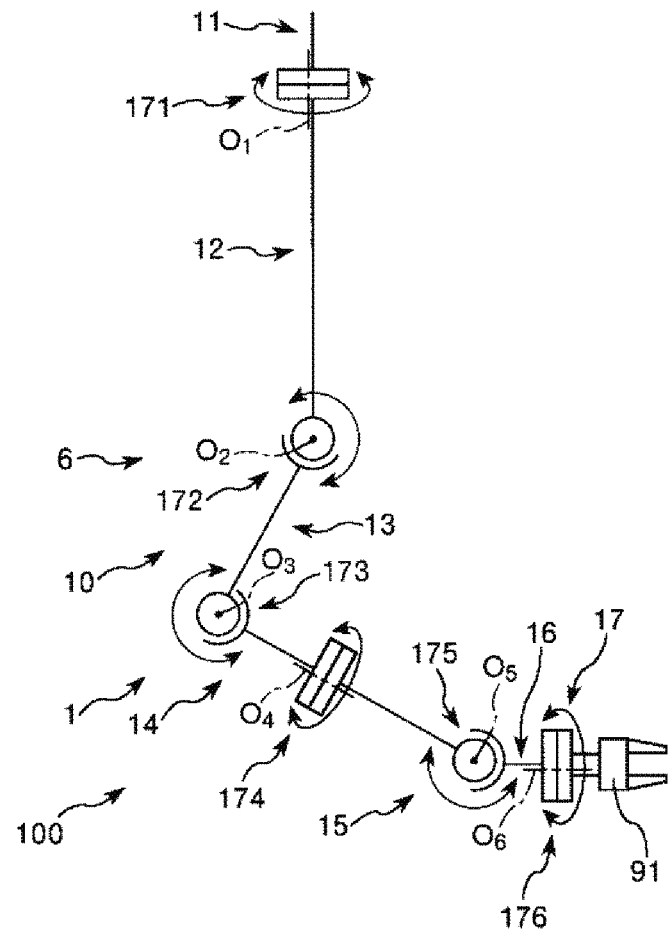
FIG. 2 is a schematic view of the robot system shown in FIG. 1.
Figure 3:
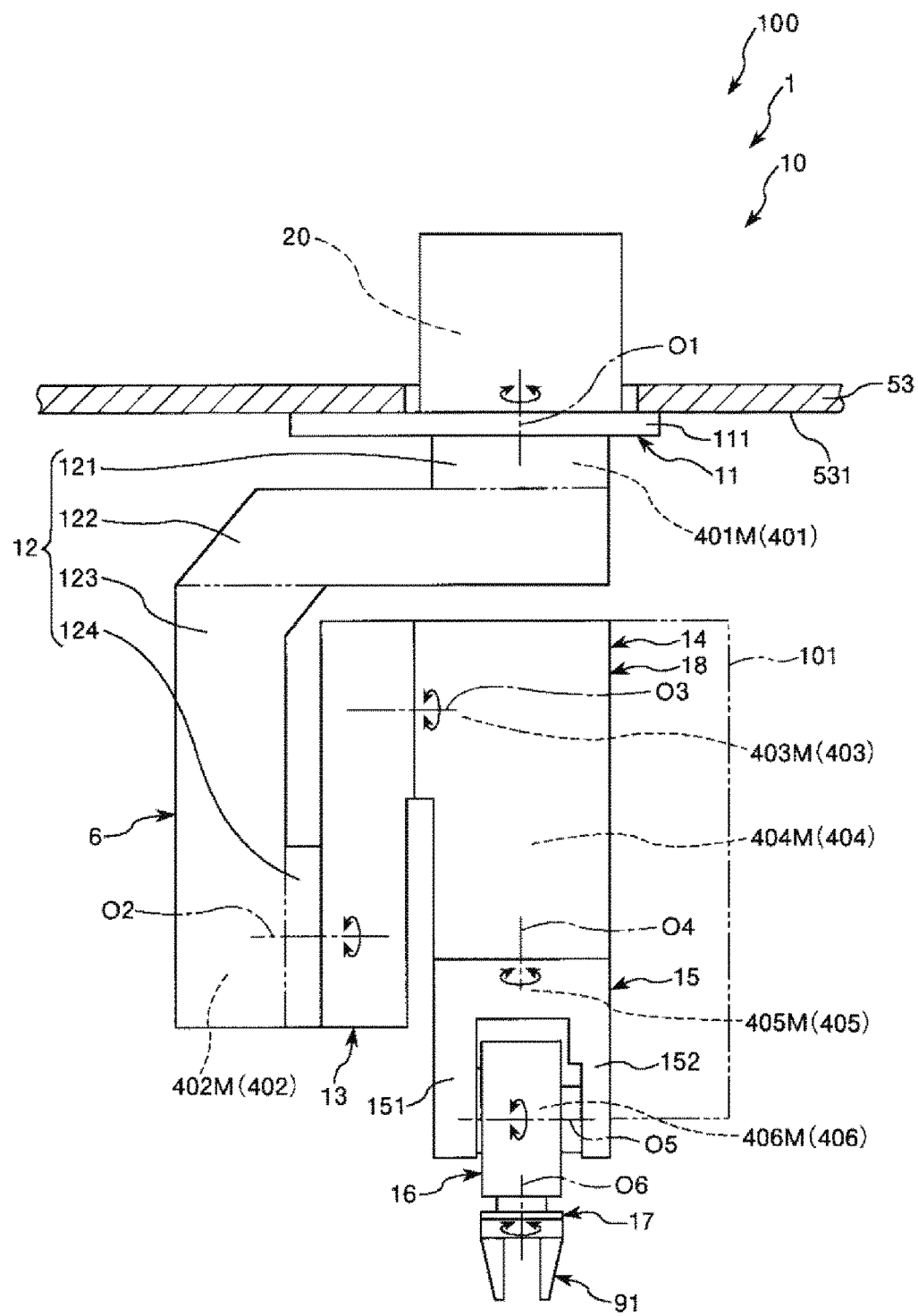
FIG. 3 is a side view of the robot system shown in FIG. 1.
Figure 4:
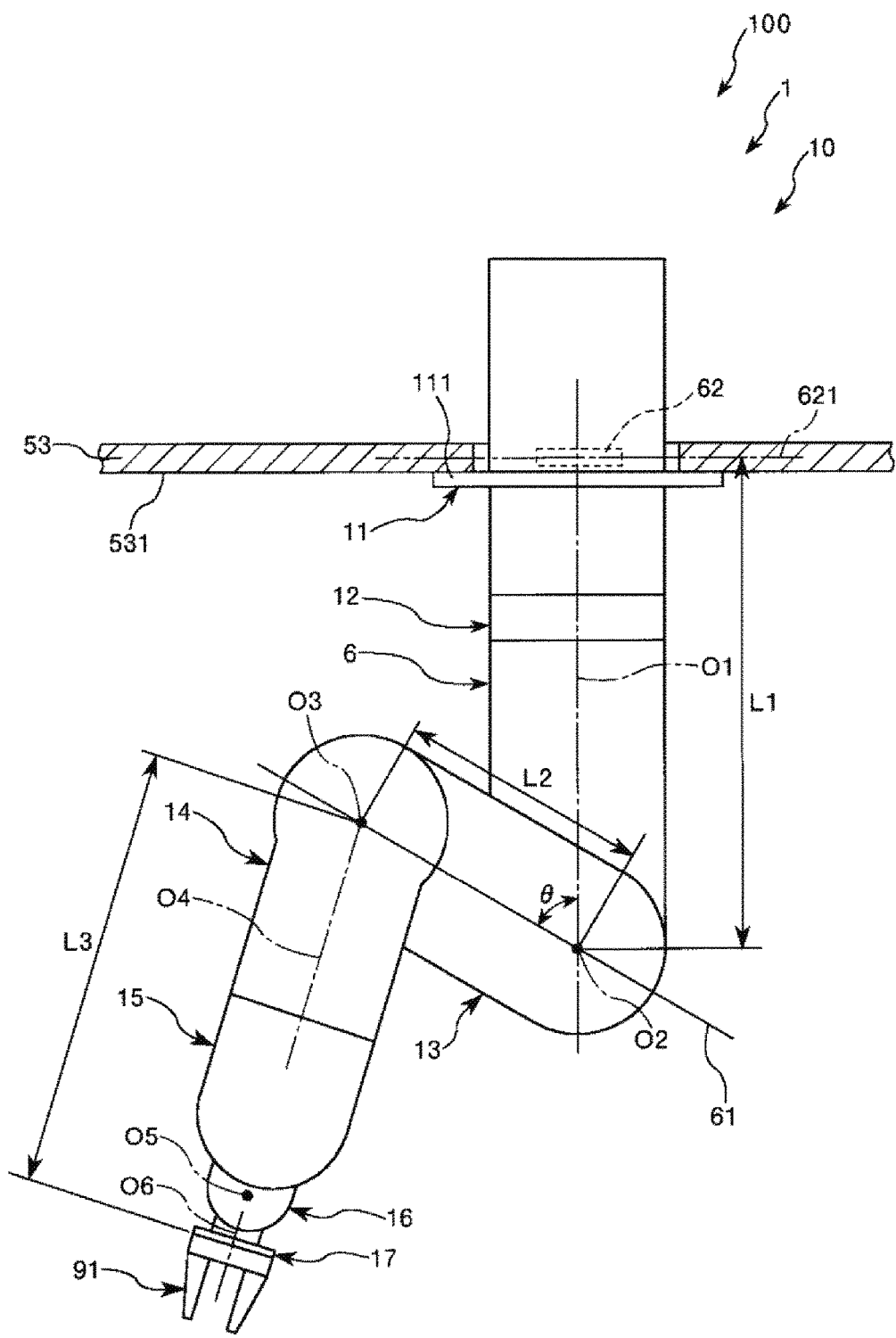
FIG. 4 is an elevation view of the robot system shown in FIG. 1.
Figure 5:
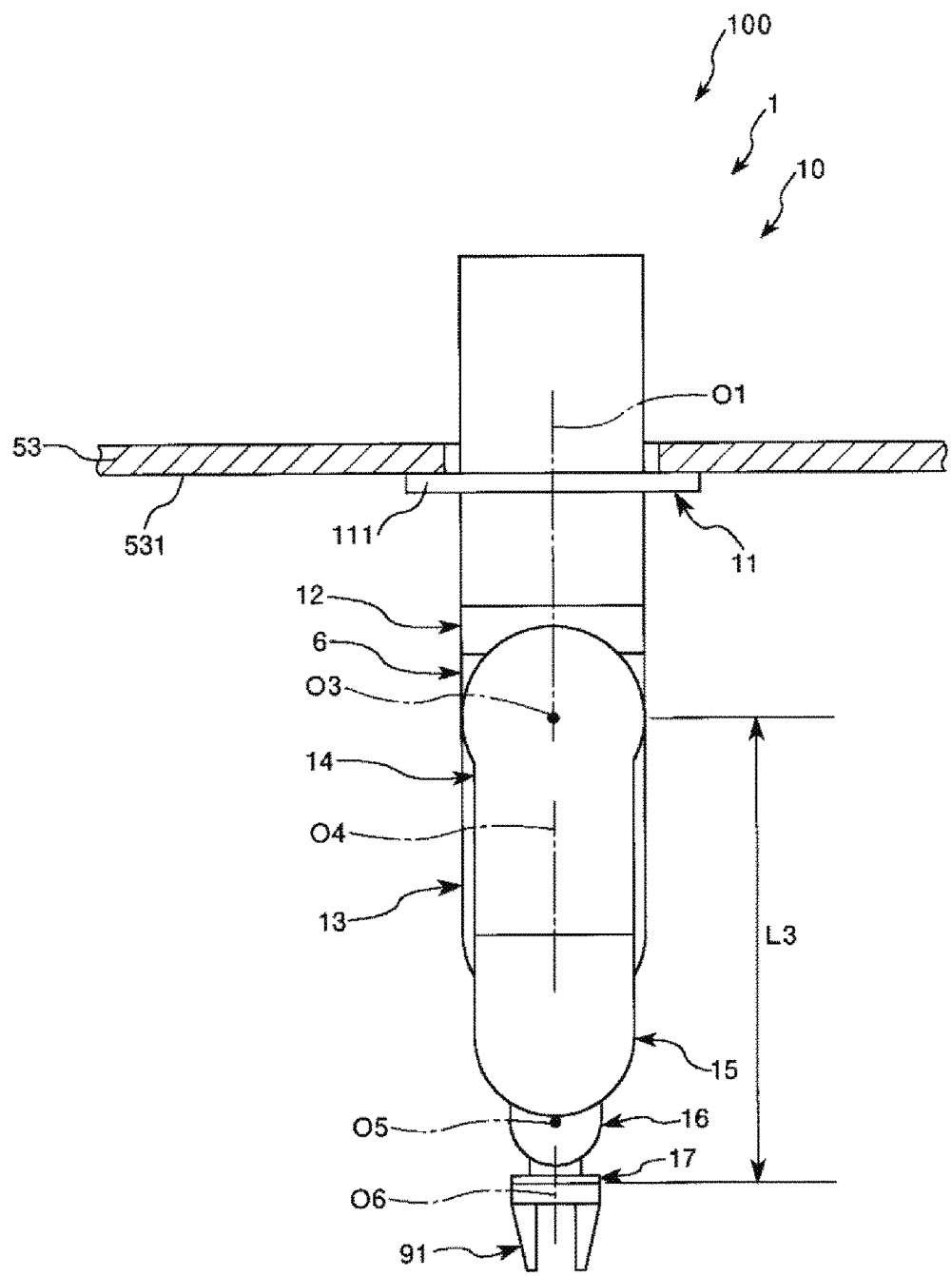
FIG. 5 is an elevation view of the robot system shown in FIG. 1.
Figure 6:
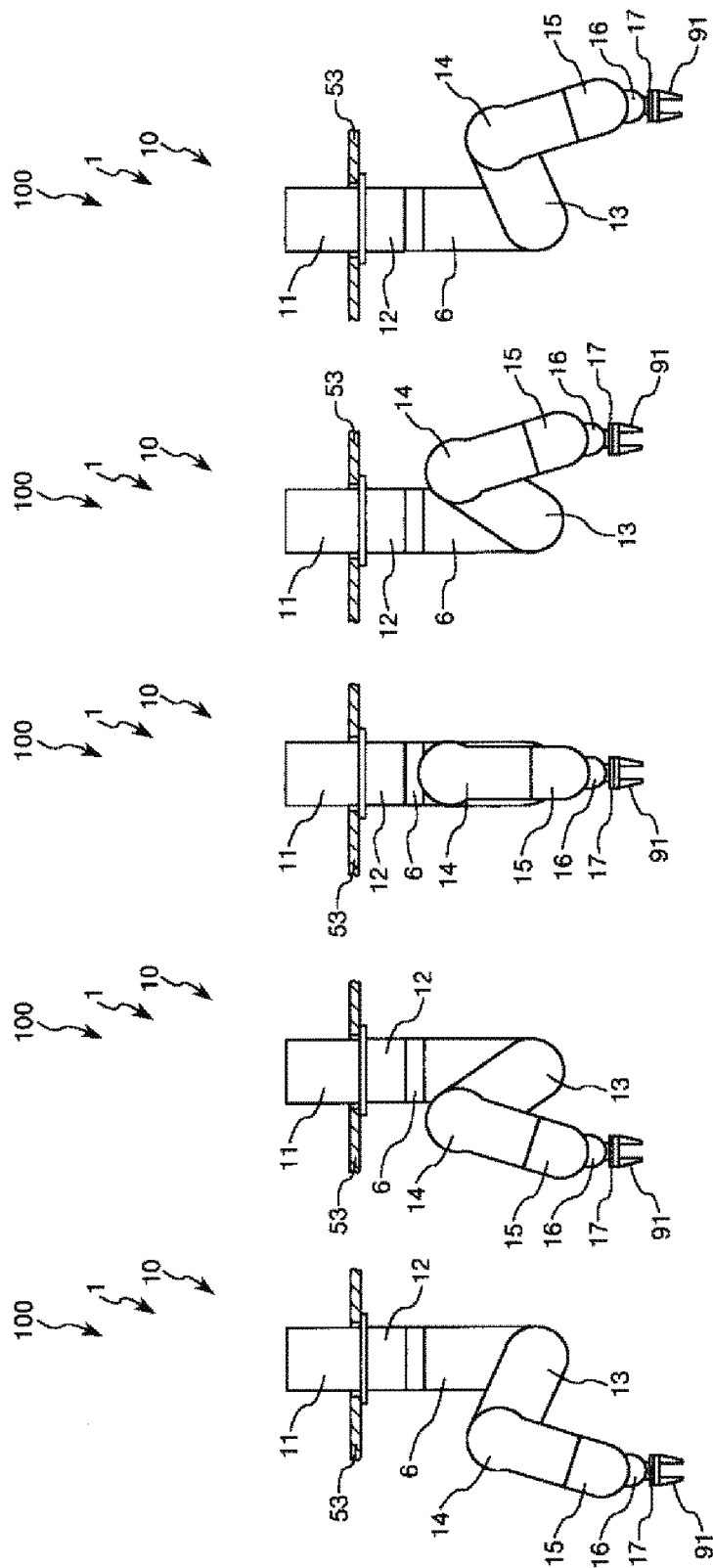
FIG. 6 is a diagram for explaining motions when the robot system shown in FIG. 1 is working.
Figure 7:
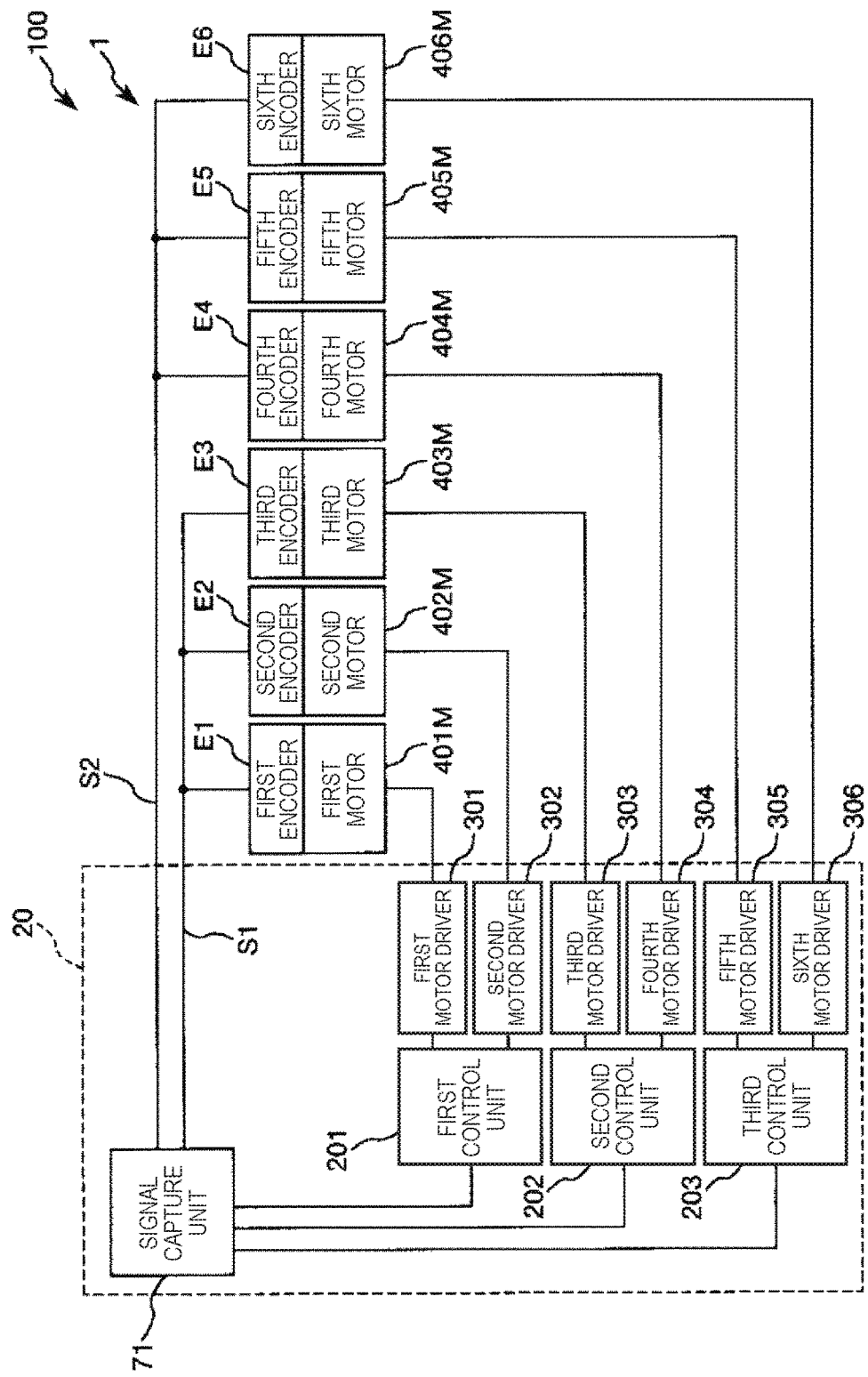
FIG. 7 is a block diagram of the robot system shown in FIG. 1.
Figure 8:
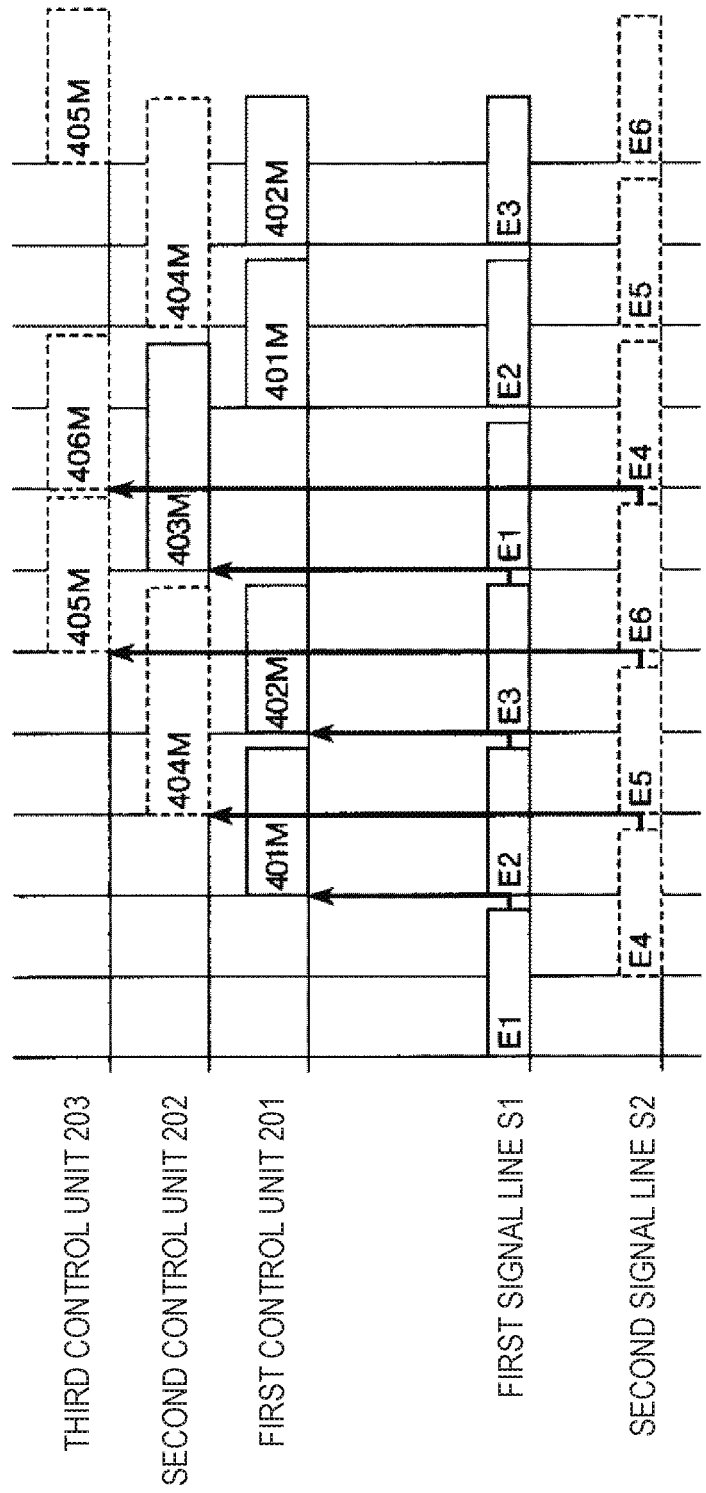
FIG. 8 is a diagram for explaining the relations among motors, encoders, signal lines, control units, and the like of the robot system shown in FIG. 1.

FIG. 1 is a perspective view showing a first embodiment of a robot system (robot) according to the invention. FIG. 2 is a schematic view of the robot system shown in FIG. 1. FIG. 3 is a side view of the robot system shown in FIG. 1. FIG. 4 is an elevation view of the robot system shown in FIG. 1. FIG. 5 is an elevation view of the robot system shown in FIG. 1. FIG. 6 is a diagram for explaining motions when the robot system shown in FIG. 1 is working. FIG. 7 is a block diagram of the robot system shown in FIG. 1. FIG. 8 is a diagram for explaining the relations among motors, encoders, signal lines, control units, and the like of the robot system shown in FIG. 1.

In the following, for convenience of description, the upper side in FIGS. 1 and 3 to 6 is referred to as "up" or "upward", and the lower side is referred to as "down" or "downward". The base side in FIGS. 1 to 6 is referred to as "proximal end" or "upstream", and the opposite side (hand side) is referred to as "distal end" or "downstream". The up-and-down direction in FIGS. 1 and 3 to 6 is the vertical direction.

As shown in FIGS. 1 to 3, a robot system (industrial robot system) 100 includes a robot (industrial robot) 1 and a control device (robot control device) 20 that controls the actuation (driving) of the robot 1. The robot system 100 can be used in, for example, a manufacturing process for manufacturing precision instrument such as a wristwatch, or the like. Moreover, the robot system 100 can perform, for example, work such as material feeding, material removing, conveying, and assembly of the precision instrument or the parts constituting the precision instrument. The control device 20 may be incorporated into a robot main body 10 (the robot 1), or may be separated from the robot main body 10. In the embodiment, however, the control device 20 is disposed on a later-described base 11 of the robot main body 10. Moreover, the control device 20 can be composed of, for example, a personal computer (PC) or the like including a central processing unit (CPU) incorporated therein. The control device 20 will be described in detail later.

The robot 1 includes the robot main body 10, a first drive source 401, a second drive source 402, a third drive source 403, a fourth drive source 404, a fifth drive source 405, and a sixth drive source 406 (six drive sources). The robot main body 10 includes the base (support portion) 11 and a robot arm 6. The robot arm 6 includes a first arm (first arm member) (arm portion) 12, a second arm (second arm member) (arm portion) 13, a third arm (third arm member) (arm portion) 14, a fourth arm (fourth arm member) (arm portion) 15, a fifth arm (fifth arm member) (arm portion) 16, and a sixth arm (sixth arm member) (arm portion) 17 (six arms). The fifth arm 16 and the sixth arm 17 constitute a wrist, and for example, an end effector such as a hand 91 can be detachably attached to a distal end of the sixth arm 17.

The robot 1 is a vertical articulated (six-axis) robot in which the base 11, the first arm 12, the second arm 13, the third arm 14, the fourth arm 15, the fifth arm 16, and the sixth arm 17 are coupled in this order from the proximal end side toward the distal end side. In the following, each of the first arm 12, the second arm 13, the third arm 14, the fourth arm 15, the fifth arm 16, and the sixth arm 17 is also referred to as "arm". Moreover, each of the first drive source 401, the second drive source 402, the third drive source 403, the fourth drive source 404, the fifth drive source 405, and the sixth drive source 406 is also referred to as "drive source".

As shown in FIG. 3, the base 11 is a portion (member to be attached) to be fixed (supported) to a predetermined portion in an installation space. This fixing method is not particularly limited, and for example, a fixing method using a plurality of bolts, or the like can be employed.

In the embodiment, the base 11 is fixed to a ceiling surface 531 of a ceiling (ceiling portion) 53 in the installation space. The ceiling surface 531 is a plane parallel to a horizontal plane. A plate-like flange 111 provided on a distal end portion of the base 11 is attached to the ceiling surface 531. However, the attachment place of the base 11 to the ceiling surface 531 is not limited to this, and for example, the attachment place may be a proximal end surface (end surface on the upper side in FIG. 3) of the base 11.

Moreover, in the robot 1, a center line (center) 621 (see FIG. 4) of a connection portion between the base 11 and the robot arm 6, that is, a later-described bearing portion 62, is located on the upper side of the ceiling surface 531 in the vertical direction. The center line 621 of the bearing portion 62 is not limited to this, and may be located on, for example, the lower side of the ceiling surface 531 in the vertical direction. Moreover, the center line 621 may be located at the same position as the ceiling surface 531 in the vertical direction.

Moreover, in the robot 1, since the base 11 is disposed on the ceiling surface 531, a center line (center) of a connection portion between the first arm 12 and the second arm 13, that is, a not-shown bearing portion that rotatably supports the second arm 13, is located on the lower side of the center line 621 of the bearing portion 62 in the vertical direction.

In the base 11, a later-described joint 171 may be or may not be included (see FIG. 2).

The first arm 12, the second arm 13, the third arm 14, the fourth arm 15, the fifth arm 16, and the sixth arm 17 are independently and displaceably supported with respect to the base 11.

As shown in FIGS. 1 to 3, the first arm 12 has a bent shape. When described in the state of FIG. 3, the first arm 12 is connected to the base 11, and includes a first portion 121 extending from the base 11 downward in FIG. 3 in an axial direction (vertical direction) of a later-described first rotating axis O1, a second portion 122 extending from a lower end of the first portion 121 in FIG. 3 to the left in FIG. 3 in an axial direction (horizontal direction) of a second rotating axis O2, a third portion 123 provided at an end portion of the second portion 122 opposite to the first portion 121 and extending downward in FIG. 3 in the axial direction (vertical direction) of the first rotating axis O1, and a fourth portion 124 extending from an end portion of the third portion 123 opposite to the second portion 122 to the right in FIG. 3 in the axial direction (horizontal direction) of the second rotating axis O2. The first portion 121, the second portion 122, the third portion 123, and the fourth portion 124 are integrally formed. Moreover, the second portion 122 and the third portion 123 are substantially orthogonal to (cross) each other as viewed in a direction orthogonal to both the first rotating axis O1 and the second rotating axis O2 (as viewed from the near side of the paper surface of FIG. 3).

The second arm 13 has a longitudinal shape, and is connected to a distal end portion of the first arm 12, that is, an end portion of the fourth portion 124 opposite to the third portion 123.

The third arm 14 has a longitudinal shape, and is connected to a distal end portion of the second arm 13, that is, an end portion of the second arm 13 opposite to an end portion thereof connected with the first arm 12.

The fourth arm 15 is connected to a distal end portion of the third arm 14, that is, an end portion of the third arm 14 opposite to an end portion thereof connected with the second arm 13. The fourth arm 15 includes a pair of support portions 151 and 152 facing each other. The support portions 151 and 152 are used for connecting the fourth arm 15 to the fifth arm 16.

The fifth arm 16 is located between the support portions 151 and 152 and connected to the support portions 151 and 152, thereby being coupled with the fourth arm 15. The fourth arm 15 is not limited to this structure, and may include, for example, one support portion (cantilever).

The sixth arm 17 has a flat-plate shape, and is connected to a proximal end portion of the fifth arm 16. Moreover, the hand 91, which grips, for example, precision instrument such as a wristwatch, a part, or the like is detachably attached as an end effector to a distal end portion (end portion on the side opposite to the fifth arm 16) of the sixth arm 17. The driving of the hand 91 is controlled by the control device 20. The hand 91 is not particularly limited, and examples thereof include, for example, a configuration including a plurality of finger portions (fingers). The robot 1 can perform work such as conveying precision instrument, a part, or the like while gripping the precision instrument, the part, or the like with the hand 91, by controlling the motions of the arms 12 to 17 and the like.

As shown in FIGS. 1 to 3, the base 11 and the first arm 12 are coupled together through the joint 171. The joint 171 includes a mechanism that rotatably supports the first arm 12 with respect to the base 11 coupled thereto. With this configuration, the first arm 12 is rotatable with respect to the base 11 about the first rotating axis O1 (around the first rotating axis O1) parallel to the vertical direction. The first rotating axis O1 coincides with the normal of the ceiling surface 531 of the ceiling 53 to which the base 11 is attached. The first rotating axis O1 is a rotating axis located on the upstream-most side of the robot 1. The rotation around the first rotating axis O1 is performed by the driving of the first drive source 401 including a first motor 401M as a first drive unit (drive unit) and a speed reducer (not shown). The first drive source 401 is driven by the first motor 401M and a cable (not shown). The driving of the first motor 401M is controlled by the control device 20. The speed reducer may be omitted.

For the first arm 12, a brake (braking device) that brakes the first arm 12 is not provided. With this configuration, the size and weight reductions of the robot 1 and the simplification of the structure can be achieved.

In the following, each of the first motor 401M, and a second motor 402M, a third motor 403M, a fourth motor 404M, a fifth motor 405M, and a sixth motor 406M, which will be described later, is also referred to as "motor".

The first arm 12 and the second arm 13 are coupled together through a joint 172. The joint 172 includes a mechanism that rotatably supports one of the first arm 12 and the second arm 13 coupled together with respect to the other. With this configuration, the second arm 13 is rotatable with respect to the first arm 12 about the second rotating axis O2 (around the second rotating axis O2) parallel to the horizontal direction. The second rotating axis O2 is orthogonal to the first rotating axis O1. The rotation around the second rotating axis O2 is performed by the driving of the second drive source 402 including the second motor 402M as a second drive unit (drive unit) and a speed reducer (not shown). The second drive source 402 is driven by the second motor 402M and a cable (not shown). The driving of the second motor 402M is controlled by the control device 20. The speed reducer may be omitted.

As a brake (braking device) that brakes the second arm 13, a brake (not shown) is provided in the vicinity of a shaft portion of the second motor 402M. With this brake, the rotation of the shaft portion of the second motor 402M is inhibited, and the posture of the second arm 13 can be maintained.

The second rotating axis O2 may be parallel to an axis orthogonal to the first rotating axis O1. Moreover, even if the second rotating axis O2 is not orthogonal to the first rotating axis O1, it is sufficient that the axial directions are different from each other.

The second arm 13 and the third arm 14 are coupled together through a joint 173. The joint 173 includes a mechanism that rotatably supports one of the second arm 13 and the third arm 14 coupled together with respect to the other. With this configuration, the third arm 14 is rotatable with respect to the second arm 13 about a third rotating axis O3 (around the third rotating axis O3) parallel to the horizontal direction. The third rotating axis O3 is parallel to the second rotating axis O2. The rotation around the third rotating axis O3 is performed by the driving of the third drive source 403 including the third motor 403M as a third drive unit (drive unit) and a speed reducer (not shown). The third drive source 403 is driven by the third motor 403M and a cable (not shown). The driving of the third motor 403M is controlled by the control device 20. The speed reducer may be omitted.

As a brake (braking device) that brakes the third arm 14, a brake (not shown) is provided in the vicinity of a shaft portion of the third motor 403M. With this brake, the rotation of the shaft portion of the third motor 403M is inhibited, and the posture of the third arm 14 can be maintained.

The third arm 14 and the fourth arm 15 are coupled together through a joint 174. The joint 174 includes a mechanism that rotatably supports one of the third arm 14 and the fourth arm 15 coupled together with respect to the other. With this configuration, the fourth arm 15 is rotatable with respect to the third arm 14 (the base 11) about a fourth rotating axis O4 (around the fourth rotating axis O4) parallel to a central axis direction of the third arm 14. The fourth rotating axis O4 is orthogonal to the third rotating axis O3. The rotation around the fourth rotating axis O4 is performed by the driving of the fourth drive source 404 including the fourth motor 404M as a fourth drive unit (drive unit) and a speed reducer (not shown). The fourth drive source 404 is driven by the fourth motor 404M and a cable (not shown). The driving of the fourth motor 404M is controlled by the control device 20. The speed reducer may be omitted.

As a brake (braking device) that brakes the fourth arm 15, a brake (not shown) is provided in the vicinity of a shaft portion of the fourth motor 404M. With this brake, the rotation of the shaft portion of the fourth motor 404M is inhibited, and the posture of the fourth arm 15 can be maintained.

The fourth rotating axis O4 may be parallel to an axis orthogonal to the third rotating axis O3. Moreover, even if the fourth rotating axis O4 is not orthogonal to the third rotating axis O3, it is sufficient that the axial directions are different from each other.

The fourth arm 15 and the fifth arm 16 are coupled together through a joint 175. The joint 175 includes a mechanism that rotatably supports one of the fourth arm 15 and the fifth arm 16 coupled together with respect to the other. With this configuration, the fifth arm 16 is rotatable with respect to the fourth arm 15 about a fifth rotating axis O5 (around the fifth rotating axis) orthogonal to a central axis direction of the fourth arm 15. The fifth rotating axis O5 is orthogonal to the fourth rotating axis O4. The rotation around the fifth rotating axis O5 is performed by the driving of the fifth drive source 405. The fifth drive source 405 includes the fifth motor 405M as a fifth drive unit (drive unit), a speed reducer (not shown), a first pulley (not shown) coupled to a shaft portion of the fifth motor 405M, a second pulley (not shown) disposed spaced from the first pulley and coupled to a shaft portion of the speed reducer, and a belt (not shown) looped around the first pulley and the second pulley. The fifth drive source 405 is driven by the fifth motor 405M and a cable (not shown). The driving of the fifth motor 405M is controlled by the control device 20. The speed reducer may be omitted.

As a brake (braking device) that brakes the fifth arm 16, a brake (not shown) is provided in the vicinity of the shaft portion of the fifth motor 405M. With this brake, the rotation of the shaft portion of the fifth motor 405M is inhibited, and the posture of the fifth arm 16 can be maintained.

The fifth rotating axis O5 may be parallel to an axis orthogonal to the fourth rotating axis O4. Moreover, even if the fifth rotating axis O5 is not orthogonal to the fourth rotating axis O4, it is sufficient that the axial directions are different from each other.

The fifth arm 16 and the sixth arm 17 are coupled together through a joint 176. The joint 176 includes a mechanism that rotatably supports one of the fifth arm 16 and the sixth arm 17 coupled together with respect to the other. With this configuration, the sixth arm 17 is rotatable with respect to the fifth arm 16 about a sixth rotating axis O6 (around the sixth rotating axis O6). The sixth rotating axis O6 is orthogonal to the fifth rotating axis O5. The rotation around the sixth rotating axis O6 is performed by the driving of the sixth drive source 406 including the sixth motor 406M as a sixth drive unit (drive unit) and a speed reducer (not shown). The sixth drive source 406 is driven by the sixth motor and a cable (not shown). The driving of the sixth motor 406M is controlled by the control device 20. The speed reducer may be omitted.

As a brake (braking device) that brakes the sixth arm 17, a brake (not shown) is provided in the vicinity of a shaft portion of the sixth motor 406M. With this brake, the rotation of the shaft portion of the sixth motor 406M is inhibited, and the posture of the sixth arm 17 can be maintained.

The sixth rotating axis O6 may be parallel to an axis orthogonal to the fifth rotating axis O5. Moreover, even if the sixth rotating axis O6 is not orthogonal to the fifth rotating axis O5, it is sufficient that the axial directions are different from each other.

The motors 401M to 406M are not particularly limited, and examples thereof include, for example, a servomotor such as an AC servomotor or a DC servomotor.

The brakes are not particularly limited, and examples thereof include, for example, an electromagnetic brake.

Also for the first arm 12, similarly to the other arms, a brake (not shown) such as an electromagnetic brake may be provided, as a brake (braking device) that brakes the first arm 12, in, for example, the vicinity of the shaft portion of the motor 401M. Conversely, the brake may be omitted in each of the second arm 13 to the sixth arm 17.

The motors 401M to 406M or the speed reducers of the drive sources 401 to 406 are provided with a first encoder E1 as a first position detecting unit that detects the position of the first arm 12, a second encoder E2 as a second position detecting unit that detects the position of the second arm 13, a third encoder E3 as a third position detecting unit that detects the position of the third arm 14, a fourth encoder E4 as a fourth position detecting unit that detects the position of the fourth arm 15, a fifth encoder E5 as a fifth position detecting unit that detects the position of the fifth arm 16, and a sixth encoder E6 as a sixth position detecting unit that detects the position of the sixth arm 17, respectively. The rotation angles of the axes of rotation of the motors 401M to 406M or the speed reducers of the drive sources 401 to 406 are respectively detected by the first encoder E1 to the sixth encoder E6. In the following, each of the first encoder E1, the second encoder E2, the third encoder E3, the fourth encoder E4, the fifth encoder E5, and the sixth encoder E6 is also referred to as "encoder".

The configuration of the robot 1 has been briefly described above.

Next, the relations among the first arm 12 to the sixth arm 17 will be described, in which expressions or the like are changed to describe the relations from various points of view. Moreover, the third arm 14 to the sixth arm 17 are considered to be in a state where these are straightly extended, that is, in a state where these are the longest, in other words, in a state where the fourth rotating axis O4 and the sixth rotating axis O6 are coincident with or parallel to each other.

First, as shown in FIG. 4, a length L1 of the first arm 12 is set longer than a length L2 of the second arm 13.

Here, as viewed in the axial direction of the second rotating axis O2, the length L1 of the first arm 12 is a distance between the second rotating axis O2 and the center line 621, extending in the left-and-right direction in FIG. 4, of the bearing portion 62 rotatably supporting the first arm 12.

As viewed in the axial direction of the second rotating axis O2, the length L2 of the second arm 13 is a distance between the second rotating axis O2 and the third rotating axis O3.

Moreover, as shown in FIG. 5, the first arm 12 and the second arm 13 are configured so as to be able to make an angle θ formed therebetween equal to 0° as viewed in the axial direction of the second rotating axis O2. That is, as viewed in the axial direction of the second rotating axis O2, the first arm 12 and the second arm 13 are configured so as to be able to overlap each other.

Then, the second arm 13 is configured so as not to interfere with the ceiling surface 531 of the ceiling 53 on which the base 11 is provided and the second portion 122 of the first arm 12 when the angle θ is 0°, that is, when the first arm 12 and the second arm 13 overlap as viewed in the axial direction of the second rotating axis O2. Similarly, also when the proximal end surface of the base 11 is attached to the ceiling surface 531, the second arm 13 is configured so as not to interfere with the ceiling surface 531 and the second portion 122 of the first arm 12.

Here, the angle θ formed by the first arm 12 and the second arm 13 is an angle formed by the first rotating axis O1 and a straight line (central axis of the second arm 13 when viewed in the axial direction of the second rotating axis O2) 61 passing through the second rotating axis O2 and the third rotating axis O3 as viewed in the axial direction of the second rotating axis O2.

Moreover, by rotating the second arm 13 without rotating the first arm 12, it is possible to move a distal end of the second arm 13 to a position different by 180° around the first rotating axis O1 through the state where the angle θ is 0° (the state where the first arm 12 and the second arm 13 overlap) as viewed in the axial direction of the second rotating axis O2 (see FIG. 6). That is, by rotating the second arm 13 without rotating the first arm 12, it is possible to move a distal end of the robot arm 6 (a distal end of the sixth arm 17) from a first position shown in the left of FIG. 6, through the state where the angle θ is 0°, to a second position different by 180° around the first rotating axis O1 and shown in the right of FIG. 6 (see FIG. 6). Each of the third arm 14 to the sixth arm 17 is rotated as necessary.

When the distal end of the second arm 13 is moved to the position different by 180° around the first rotating axis O1 (when the distal end of the robot arm 6 is moved from the first position to the second position), the distal end of the second arm 13 and the distal end of the robot arm 6 move on a straight line as viewed in the axial direction of the first rotating axis O1.

The total length (maximum length) L3 of the third arm 14 to the sixth arm 17 is set longer than the length L2 of the second arm 13.

With this configuration, when the second arm 13 and the third arm 14 overlap as viewed in the axial direction of the second rotating axis O2, the distal end of the sixth arm can be projected from the second arm 13. With this configuration, the hand 91 can be prevented from interfering with the first arm 12 and the second arm 13.

Here, the total length (maximum length) L3 of the third arm 14 to the sixth arm 17 is a distance between the third rotating axis O3 and the distal end of the sixth arm 17 as viewed in the axial direction of the second rotating axis O2 (see FIG. 4). In this case, as shown in FIG. 4, the third arm 14 to the sixth arm 17 are in a state where the fourth rotating axis O4 and the sixth rotating axis O6 are coincident with or parallel to each other.

As shown in FIG. 5, the second arm 13 and the third arm 14 are configured so as to be able to overlap as viewed in the axial direction of the second rotating axis O2.

That is, the first arm 12, the second arm 13, and the third arm 14 are configured so as to be able to simultaneously overlap as viewed in the axial direction of the second rotating axis O2.

In the robot 1, by satisfying the relations described above, it is possible, by rotating the second arm 13 and the third arm 14 without rotating the first arm 12, to move the hand 91 (the distal end of the sixth arm 17) to the position different by 180° around the first rotating axis O1 through the state where the angle θ formed by the first arm 12 and the second arm 13 is 0° (the state where the first arm 12 and the second arm 13 overlap) as viewed in the axial direction of the second rotating axis O2. By the use of this motion, the robot 1 can be efficiently driven, a space provided for the robot 1 to avoid interference can be made small, and various advantages are provided as will be described last.

Next, the configuration of the control device 20 will be described.

As shown in FIG. 7, the control device 20 includes a first control unit 201 that controls the driving (actuation) of the first motor 401M and the second motor 402M, a second control unit 202 that controls the driving of the third motor 403M and the fourth motor 404M, a third control unit 203 that controls the driving of the fifth motor 405M and the sixth motor 406M, a first motor driver 301, a second motor driver 302, a third motor driver 303, a fourth motor driver 304, a fifth motor driver 305, a sixth motor driver 306, and a signal capture unit 71 to which signals (information) detected by the encoders E1 to E6 are input and which outputs the signals to the corresponding control units.

The signal capture unit 71 is not particularly limited, and examples thereof include, for example, an FPGA. Each of the first control unit 201 to the third control unit 203 is not particularly limited, and examples thereof include, for example, a DSP and a CPU.

The first motor driver 301 to the sixth motor driver 306 may not be components of the control device 20 but may be components of the robot 1.

In the following, each of the first control unit 201, the second control unit 202, and the third control unit 203 is also referred to as "control unit". Moreover, each of the first motor driver 301, the second motor driver 302, the third motor driver 303, the fourth motor driver 304, the fifth motor driver 305, and the sixth motor driver 306 is also referred to as "motor driver".

The signal capture unit 71, and the first encoder E1, the second encoder E2, and the third encoder E3 are electrically connected by means of one common first signal line S1. The signal detected by the first encoder E1, the signal detected by the second encoder E2, and the signal detected by the third encoder E3 flow (pass) through the first signal line S1 and are input to the signal capture unit 71. In this case, each of the signals detected by the encoders E1, E2, and E3 is divided every predetermined time and sequentially transmitted (see FIG. 8).

The signal capture unit 71, and the fourth encoder E4, the fifth encoder E5, and the sixth encoder E6 are electrically connected by means of one common second signal line S2. The signal detected by the fourth encoder E4, the signal detected by the fifth encoder E5, and the signal detected by the sixth encoder E6 flow through the second signal line S2 and are input to the signal capture unit 71. In this case, each of the signals detected by the encoders E4, E5, and E6 is divided every predetermined time and sequentially transmitted (see FIG. 8).

Each of the first signal line S1 and the second signal line S2 is a wire (signal line) of multidrop connected encoders and composed of, for example, a plurality of wires such as a power line, a ground line, and two unit signal lines (not shown). The plurality of (four in the example) wires constituting the wire of the multidrop connected encoders is referred to as one signal line. The expression "unit signal line" is used to distinguish the unit signal line from the first signal line S1, the second signal line S2, and the signal line, and a predetermined signal flows through the unit signal line. In the following, each of the first signal line S1 and the second signal line S2 is also referred to as "signal line".

By setting the number of signal lines to two as described above, the robot arm 6 can be made thin, compared with the case where the number of signal lines is set to six, which is the same as the number of encoders (motors). With this configuration, work in a narrow space can be easily performed.

Moreover, by setting the number of signal lines to two, the time required to transmit all of the signals detected by the encoders E1 to E6 can be shortened, compared with the case where the number of signal lines is set to one. With this configuration, the time (control cycle) taken to make one round of control of the motors 401M to 406M can be shortened, and thus the control of the robot 1 can be quickly performed.

The signal capture unit 71 and each of the first control unit 201, the second control unit 202, and the third control unit 203 are electrically connected.

The first motor driver 301 and the second motor driver 302 are electrically connected to the first control unit 201. The first motor 401M is electrically connected to the first motor driver 301, and the second motor 402M is electrically connected to the second motor driver 302. The first control unit 201, the second control unit 202, and the third control unit 203 are connected in parallel.

The signal capture unit 71 sends the signal detected by the first encoder E1 and the signal detected by the second encoder E2 to the first control unit 201 (see FIG. 8). The first control unit 201 controls, based on the signal detected by the first encoder E1, the driving of the first motor 401M through the first motor driver 301, and controls, based on the signal detected by the second encoder E2, the driving of the second motor 402M through the second motor driver 302 (see FIG. 8).

The third motor driver 303 and the fourth motor driver 304 are electrically connected to the second control unit 202. The third motor 403M is electrically connected to the third motor driver 303, and the fourth motor 404M is electrically connected to the fourth motor driver 304.

The signal capture unit 71 sends the signal detected by the third encoder E3 and the signal detected by the fourth encoder E4 to the second control unit 202 (see FIG. 8). The second control unit 202 controls, based on the signal detected by the third encoder E3, the driving of the third motor 403M through the third motor driver 303, and controls, based on the signal detected by the fourth encoder E4, the driving of the fourth motor 404M through the fourth motor driver 304 (see FIG. 8).

The fifth motor driver 305 and the sixth motor driver 306 are electrically connected to the third control unit 203. The fifth motor 405M is electrically connected to the fifth motor driver 305, and the sixth motor 406M is electrically connected to the sixth motor driver 306.

The signal capture unit 71 sends the signal detected by the fifth encoder E5 and the signal detected by the sixth encoder E6 to the third control unit 203 (see FIG. 8). The third control unit 203 controls, based on the signal detected by the fifth encoder E5, the driving of the fifth motor 405M through the fifth motor driver 305, and controls, based on the signal detected by the sixth encoder E6, the driving of the sixth motor 406M through the sixth motor driver 306 (see FIG. 8).

By setting the number of control units to three as described above, a circuit board of the control device 20 can be made small and the control device 20 can be reduced in size, compared with the case where the number of control units is set to six, which is the same as the number of motors.

Here, when the number of signal lines such as the signal lines S1 and S2 is L, the number of control units such as the first control unit 201, the second control unit 202, and the third control unit 203 is m, and the numbers of encoders, arms, and motors (drive sources) are n, L, m, and n are 2, 3, and 6, respectively, in the embodiment, and the robot 1 satisfies the relations of $2 \leq L < n$ and $2 \leq m < n$. Moreover, the robot 1 more preferably satisfies the relations of $2 \leq L < n$ and $3 \leq m < n$, further preferably satisfies the relations of $2 \leq L < n$, $3 \leq m < n$, and $L \leq m$, and particularly preferably satisfies the relations of $2 \leq L < n$, $3 \leq m < n$, and $L < m$.

With this configuration, since the number of signal lines is less than the numbers of encoders, motors, and arms, the robot arm 6 can be made thin, and thus work in a narrow space can be easily performed.

Moreover, by setting the number of signal lines to more than one, the time required to transmit all of the signals detected by the encoders E1 to E6 can be shortened. With this configuration, the time taken to make one round of control of the motors 401M to 406M can be shortened, and thus the control of the robot 1 can be quickly performed.

Moreover, since the number of control units is less than the numbers of encoders, motors, and arms, the circuit board of the control device 20 can be made small, and the control device 20 can be reduced in size.

When all of the number of encoders, the number of arms, and the number of motors are not the same, it is sufficient that the number n of at least one of them satisfies the relations. However, the numbers n of at least two of them preferably satisfy the relations, and the numbers n of all of the three more preferably satisfy the relations.

As has been described above, according to the robot system 100, the robot arm 6 can be made thin, and thus work in a narrow space can be easily performed.

Moreover, the time required to transmit all of the signals detected by the encoders E1 to E6 can be shortened, thus the time taken to make one round of control of the motors 401M to 406M can be shortened, and thus the control of the robot 1 can be quickly performed.

Moreover, the circuit board of the control device 20 can be made small, and the control device 20 can be reduced in size.

Moreover, by rotating the second arm 13, the third arm 14, and the like without rotating the first arm 12, the robot 1 can move the hand 91 (the distal end of the robot arm 6) to the position different by 180° around the first rotating axis O1 through the state where the angle θ formed by the first arm 12 and the second arm 13 is 0° (the state where the first arm 12 and the second arm 13 overlap) as viewed in the axial direction of the second rotating axis O2.

With this configuration, the space for the robot 1 to avoid interference can be made small.

That is, first, the ceiling 53 can be lowered, and thus, the position of the center of gravity of the robot 1 is lowered and the influence of vibration of the robot 1 can be reduced. That is, vibration generated by a reaction force due to the motion of the robot 1 can be suppressed.

Moreover, an operating area of the robot 1 in the width direction (direction of a production line) can be reduced, and thus, many robots 1 per unit length can be disposed along the production line and the production line can be shortened.

Moreover, when the hand 91 is moved, the movements of the robot 1 can be reduced. For example, the first arm 12 is not rotated, or the rotating angle of the first arm 12 can be reduced, and thus, a takt time can be shortened and work efficiency can be improved.

Moreover, when it is intended to implement the motion (hereinafter also referred to as "shortcut motion") of moving the hand 91 (the distal end of the robot arm 6) of the robot 1 to the position different by 180° around the first rotating axis O1 by simply rotating the first arm 12 around the first rotating axis O1 like a related-art robot, the robot 1 may interfere with a wall (not shown) or peripheral device (not shown) in the vicinity thereof, and therefore, it is necessary to teach the robot 1 a retraction point for avoiding the interference. For example, if the robot 1 interferes with the wall when only the first arm 12 is rotated by 90° around the first rotating axis O1, it is necessary to teach a retraction point so as not to interfere with the wall by rotating also the other arms. Similarly, if the robot 1 also interferes with the peripheral device, it is necessary to teach the robot 1 an additional retraction point so as not to interfere with the peripheral device. In the related-art robot as described above, it is necessary to teach a number of retraction points, and in particular, when a space around the robot 1 is small, an enormous number of retraction points become necessary and much effort and a long time are required for teaching.

In contrast, in the robot 1, when the shortcut motion is implemented, the area or portion with which the robot 1 may interfere is greatly reduced. Therefore, the number of retraction points to be taught can be reduced, and the effort and time required for teaching can be reduced. That is, in the robot 1, the number of retraction points to be taught is reduced to, for example, approximately ⅓ of the related-art robot, and teaching is dramatically facilitated.

Moreover, an area (portion) 101 to the right of the third arm 14 and the fourth arm 15 and surrounded by the dashed-double dotted line in FIG. 3 is an area (portion) where the robot 1 does not interfere or is less likely to interfere with the robot 1 itself or other members. For this reason, when a predetermined member is mounted in the area 101, the member is less likely to interfere with the robot 1, a peripheral device, and the like. For this reason, in the robot 1, a predetermined member can be mounted in the area 101. In particular, when the predetermined member is mounted in an area of the area 101, which is to the right of the third arm 14 in FIG. 3, the probability of the member interfering with a peripheral device (not shown) disposed on a not-shown work table is further lowered, and therefore, the mounting of the predetermined member in the area is more effective.

Examples of the member that can be mounted in the area 101 include, for example, a hand, a control device that controls the driving of a sensor such as a hand-eye camera, and a solenoid valve of a suction mechanism.

As a specific example, for example, in the case where a suction mechanism is provided at a hand, when a solenoid valve or the like is installed in the area 101, the solenoid valve is not obstructive when the robot 1 is driven. As described above, the area 101 is of high convenience.

Second Embodiment

Figure 9:
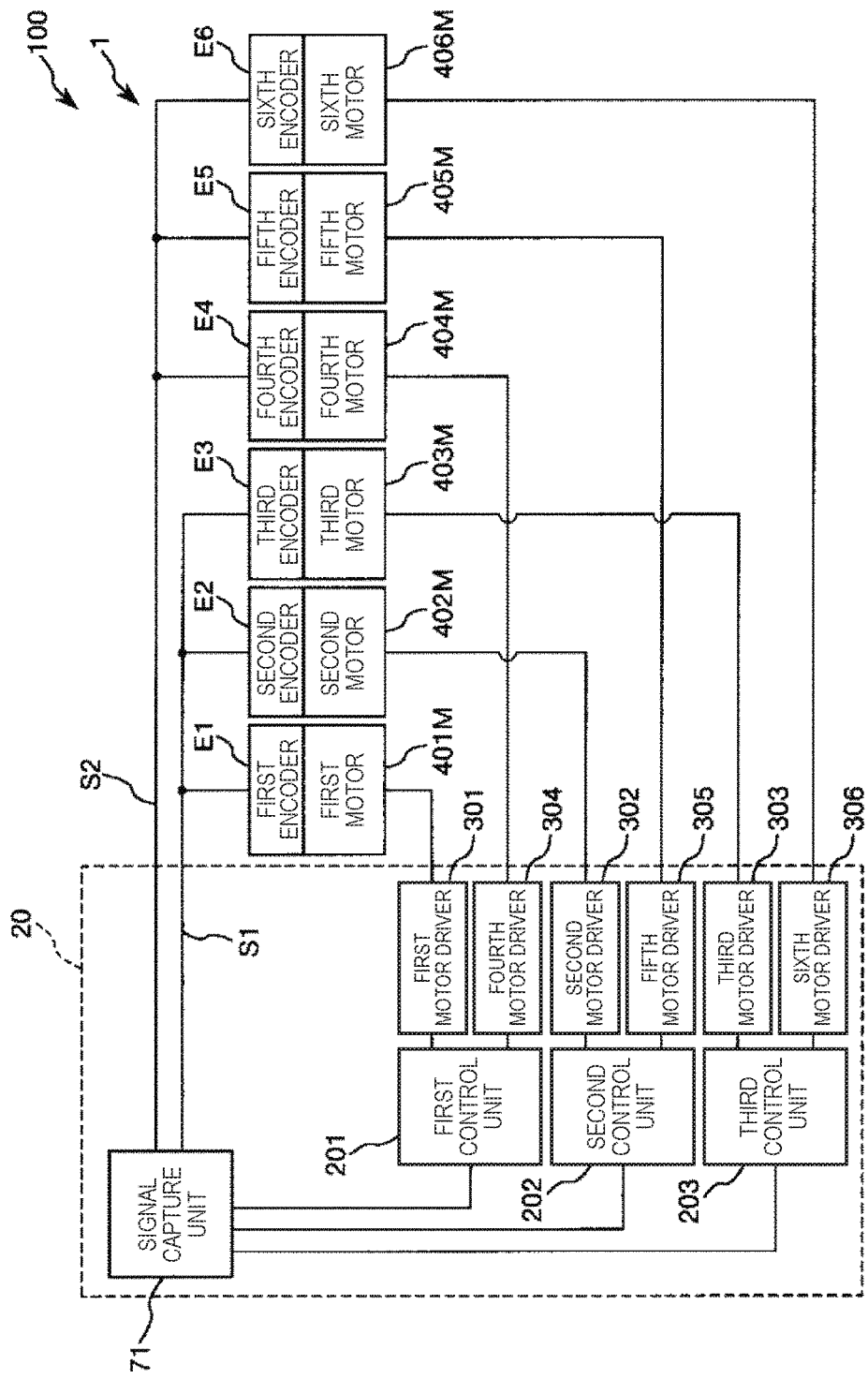
FIG. 9 is a block diagram showing a second embodiment of a robot system according to the invention.
Figure 10:
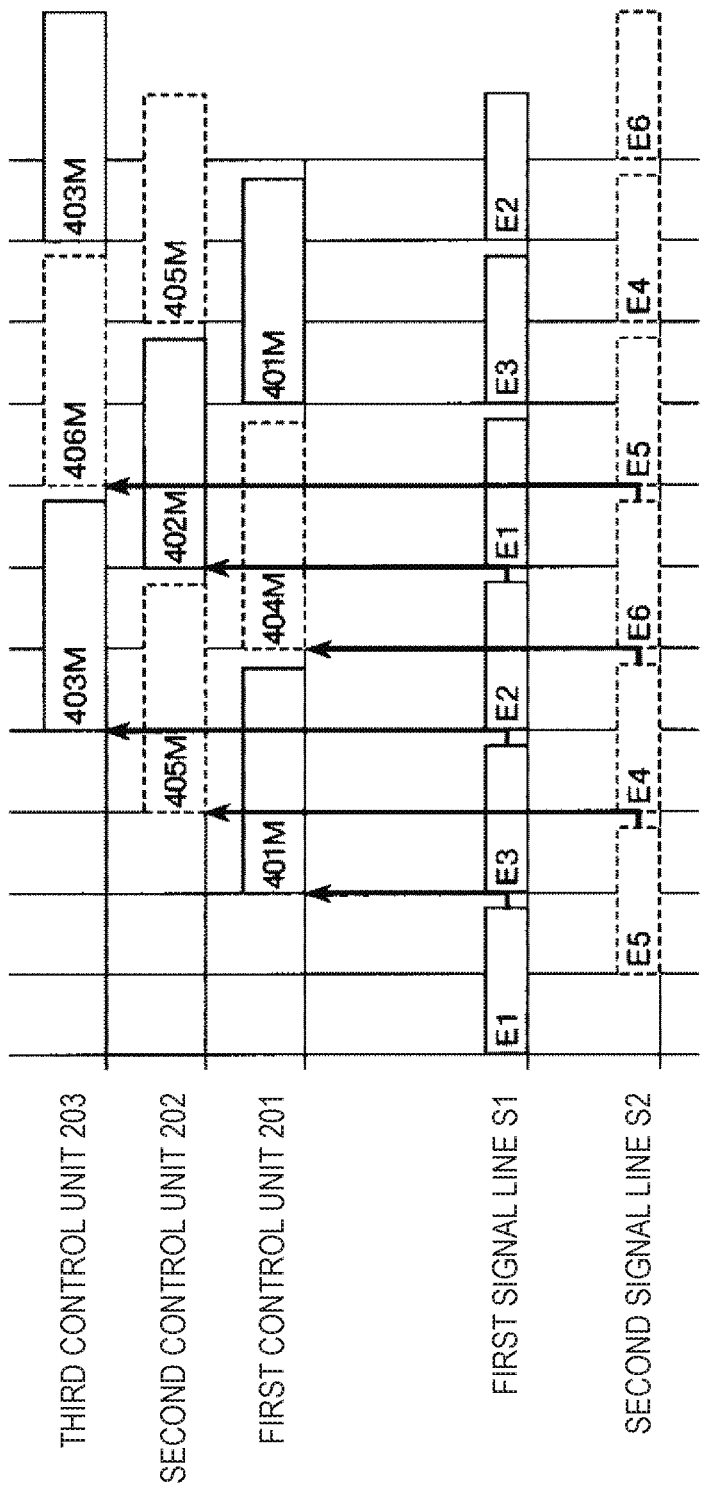
FIG. 10 is a diagram for explaining the relations among motors, encoders, signal lines, control units, and the like of the robot system shown in FIG. 9.

FIG. 9 is a block diagram showing a second embodiment of a robot system according to the invention. FIG. 10 is a diagram for explaining the relations among motors, encoders, signal lines, control units, and the like of the robot system shown in FIG. 9.

Hereinafter, the second embodiment will be described mainly on differences from the first embodiment described above, and a description of similar matters is omitted.

The "third position detecting unit" and the "third drive unit" in the appended claim are the "fourth encoder E4" and the "fourth motor 404M", respectively, in the second embodiment.

As shown in FIG. 9, in the robot system 100 of the second embodiment, the first motor driver 301 and the fourth motor driver 304 are electrically connected to the first control unit 201 of the control device 20. The first motor 401M is electrically connected to the first motor driver 301, and the fourth motor 404M is electrically connected to the fourth motor driver 304.

The signal capture unit 71 sends the signal detected by the first encoder E1 and the signal detected by the fourth encoder E4 to the first control unit 201 (see FIG. 10). The first control unit 201 controls, based on the signal detected by the first encoder E1, the driving of the first motor 401M through the first motor driver 301, and controls, based on the signal detected by the fourth encoder E4, the driving of the fourth motor 404M through the fourth motor driver 304 (see FIG. 10).

The second motor driver 302 and the fifth motor driver 305 are electrically connected to the second control unit 202. The second motor 402M is electrically connected to the second motor driver 302, and the fifth motor 405M is electrically connected to the fifth motor driver 305.

The signal capture unit 71 sends the signal detected by the second encoder E2 and the signal detected by the fifth encoder E5 to the second control unit 202 (see FIG. 10). The second control unit 202 controls, based on the signal detected by the second encoder E2, the driving of the second motor 402M through the second motor driver 302, and controls, based on the signal detected by the fifth encoder E5, the driving of the fifth motor 405M through the fifth motor driver 305 (see FIG. 10).

The third motor driver 303 and the sixth motor driver 306 are electrically connected to the third control unit 203. The third motor 403M is electrically connected to the third motor driver 303, and the sixth motor 406M is electrically connected to the sixth motor driver 306.

The signal capture unit 71 sends the signal detected by the third encoder E3 and the signal detected by the sixth encoder E6 to the third control unit 203 (see FIG. 10). The third control unit 203 controls, based on the signal detected by the third encoder E3, the driving of the third motor 403M through the third motor driver 303, and controls, based on the signal detected by the sixth encoder E6, the driving of the sixth motor 406M through the sixth motor driver 306 (see FIG. 10).

Since the first control unit 201 controls the driving of the first motor 401M and the fourth motor 404M based on the signals flowing through the first signal line S1 and the second signal line S2 different from each other as described above, the timing of controlling the driving of the first motor 401M and the fourth motor 404M can be relatively freely set, and wasted waiting time can be reduced or eliminated. The same applies to the second control unit 202 and the third control unit 203. With this configuration, the amounts of control computation of the control units 201 to 203 can be equalized, the time taken to make one round of control of the motors 401M to 406M can be further shortened, and thus the control of the robot 1 can be more quickly performed.

Another way to define the above configuration is that a difference between the maximum value and the minimum value among the number of drive units (encoders) ("1" in the embodiment) that the first control unit 201 controls based on the signal flowing through the first signal line S1, the number of drive units ("1" in the embodiment) that the second control unit 202 controls based on the signal flowing through the first signal line S1, and the number of drive units ("1" in the embodiment) that the third control unit 203 controls based on the signal flowing through the first signal line S1 is 1 or less ("0" in the embodiment). Moreover, a difference between the maximum value and the minimum value among the number of drive units (encoders) ("1" in the embodiment) that the first control unit 201 controls based on the signal flowing through the second signal line S2, the number of drive units ("1" in the embodiment) that the second control unit 202 controls based on the signal flowing through the second signal line S2, and the number of drive units ("1" in the embodiment) that the third control unit 203 controls based on the signal flowing through the second signal line S2 is 1 or less ("0" in the embodiment).

That is, in the case where the first control unit 201, the second control unit 202, and the third control unit 203 (m control units) are compared, when attention is paid to a common signal line in each of the first signal line S1 and the second signal line S2 (L signal lines), a difference between the maximum value and the minimum value of the number of drive units that the control unit controls based on the signal flowing through the common signal line is 1 or less.

With this configuration, the amounts of control computation of the control units 201 to 203 can be equalized, the time taken to make one round of control of the motors 401M to 406M can be further shortened, and thus the control of the robot 1 can be more quickly performed.

Also according to the second embodiment described above, advantageous effects similar to those of the first embodiment described above can be provided.

Third Embodiment

Figure 11:
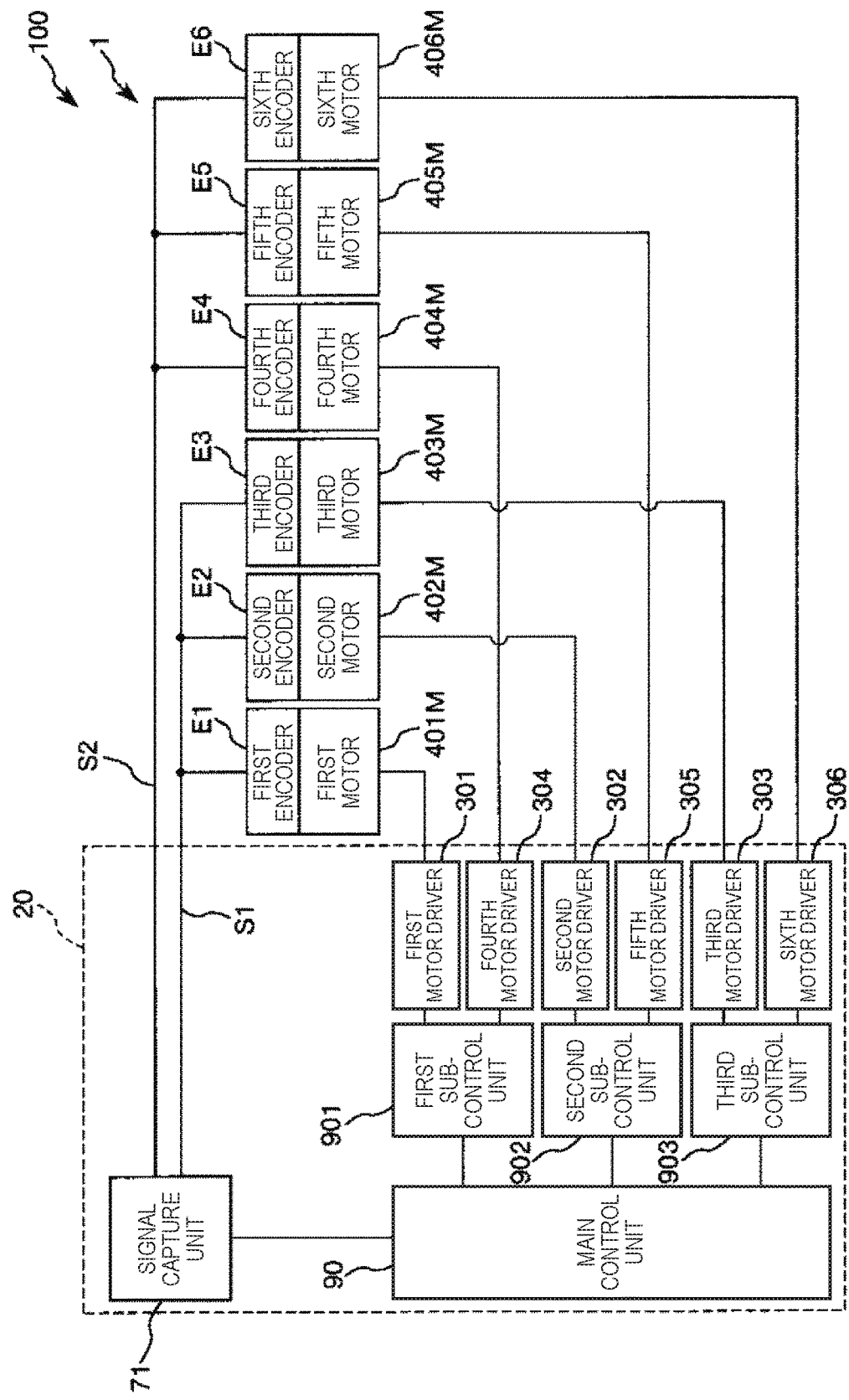
FIG. 11 is a block diagram showing a third embodiment of a robot system according to the invention.

FIG. 11 is a block diagram showing a third embodiment of a robot system according to the invention.

Hereinafter, the third embodiment will be described mainly on differences from the second embodiment described above, and a description of similar matters is omitted.

As shown in FIG. 11, in the robot system 100 of the third embodiment, the control device 20 includes a main control unit 90 that controls the driving of the first motor 401M to the sixth motor 406M, a first sub-control unit (first control unit) 901 that controls the driving of the first motor 401M and the fourth motor 404M, a second sub-control unit (second control unit) 902 that controls the driving of the second motor 402M and the fifth motor 405M, a third sub-control unit (third control unit) 903 that controls the driving of the third motor 403M and the sixth motor 406M, the first motor driver 301, the second motor driver 302, the third motor driver 303, the fourth motor driver 304, the fifth motor driver 305, the sixth motor driver 306, and the signal capture unit 71.

The signal capture unit 71 is not particularly limited, and examples thereof include, for example, an FPGA. Each of the main control unit 90 and the first sub-control unit 901 to the third sub-control unit 903 is not particularly limited, and examples thereof include, for example, a DSP and a CPU.

The main control unit 90 may be composed of one element or may be composed of a plurality of elements. When the main control unit 90 is composed of two elements, the main control unit 90 can be composed of, for example, a DSP and a CPU.

The signal capture unit 71 and the main control unit 90 are electrically connected.

The main control unit 90 and each of the first sub-control unit 901, the second sub-control unit 902, and the third sub-control unit 903 are electrically connected. The first sub-control unit 901, the second sub-control unit 902, and the third sub-control unit 903 are connected in parallel.

In controls such as position control, speed control, torque control, and current control of the robot 1, the position control and the speed control, for example, are performed in the main control unit 90, and the torque control and the current control, for example, are performed in each of the first sub-control unit 901, the second sub-control unit 902, and the third sub-control unit 903.

Also according to the third embodiment described above, advantageous effects similar to those of the second embodiment described above can be provided.

Although an example in which L, m, and n are 2, 3, and 6, respectively, has been described in the above, configuration examples (modified examples) in which L, m, and n are other numbers will be briefly described below. In the following configuration examples, the members appearing in the first to third embodiments are described with similar reference signs, while new members are described without reference signs.

Configuration Example 1

In Configuration Example 1, L, m, and n are 2, 4, and 7, respectively.

In Configuration Example 1, the first encoder E1, the second encoder E2, and the third encoder E3 are electrically connected to the first signal line S1. The signal detected by the first encoder E1, the signal detected by the second encoder E2, and the signal detected by the third encoder E3 flow through the first signal line S1.

The fourth encoder E4, the fifth encoder E5, the sixth encoder E6, and a seventh encoder are electrically connected to the second signal line S2. The signal detected by the fourth encoder E4, the signal detected by the fifth encoder E5, the signal detected by the sixth encoder E6, and a signal detected by the seventh encoder flow through the second signal line S2.

The first control unit 201 controls the driving of the first motor 401M based on the signal detected by the first encoder E1, and controls the driving of the fourth motor 404M based on the signal detected by the fourth encoder E4.

The second control unit 202 controls the driving of the second motor 402M based on the signal detected by the second encoder E2, and controls the driving of the fifth motor 405M based on the signal detected by the fifth encoder E5.

The third control unit 203 controls the driving of the third motor 403M based on the signal detected by the third encoder E3, and controls the driving of the sixth motor 406M based on the signal detected by the sixth encoder E6.

A fourth control unit controls the driving of a seventh motor based on the signal detected by the seventh encoder.

Configuration Example 2

In Configuration Example 2, L, m, and n are 3, 3, and 6, respectively.

In Configuration Example 2, the first encoder E1 and the second encoder E2 are electrically connected to the first signal line S1. The signal detected by the first encoder E1 and the signal detected by the second encoder E2 flow through the first signal line S1.

The third encoder E3 and the fourth encoder E4 are electrically connected to the second signal line S2. The signal detected by the third encoder E3 and the signal detected by the fourth encoder E4 flow through the second signal line S2.

The fifth encoder E5 and the sixth encoder E6 are electrically connected to a third signal line S3. The signal detected by the fifth encoder E5 and the signal detected by the sixth encoder E6 flow through the third signal line S3.

The first control unit 201 controls the driving of the first motor 401M based on the signal detected by the first encoder E1, and controls the driving of the fourth motor 404M based on the signal detected by the fourth encoder E4.

The second control unit 202 controls the driving of the second motor 402M based on the signal detected by the second encoder E2, and controls the driving of the fifth motor 405M based on the signal detected by the fifth encoder E5.

The third control unit 203 controls the driving of the third motor 403M based on the signal detected by the third encoder E3, and controls the driving of the sixth motor 406M based on the signal detected by the sixth encoder E6.

Configuration Example 3

In Configuration Example 3, L, m, and n are 3, 4, and 8, respectively.

In Configuration Example 3, the first encoder E1 and the second encoder E2 are electrically connected to the first signal line S1. The signal detected by the first encoder E1 and the signal detected by the second encoder E2 flow through the first signal line S1.

The third encoder E3, the fourth encoder E4, and the fifth encoder E5 are electrically connected to the second signal line S2. The signal detected by the third encoder E3, the signal detected by the fourth encoder E4, and the signal detected by the fifth encoder E5 flow through the second signal line S2.

The sixth encoder E6, the seventh encoder, and an eighth encoder are electrically connected to the third signal line S3. The signal detected by the sixth encoder E6, the signal detected by the seventh encoder, and a signal detected by the eighth encoder flow through the third signal line S3.

The first control unit 201 controls the driving of the first motor 401M based on the signal detected by the first encoder E1, and controls the driving of the fifth motor 405M based on the signal detected by the fifth encoder E5.

The second control unit 202 controls the driving of the second motor 402M based on the signal detected by the second encoder E2, and controls the driving of the sixth motor 406M based on the signal detected by the sixth encoder E6.

The third control unit 203 controls the driving of the third motor 403M based on the signal detected by the third encoder E3, and controls the driving of the seventh motor based on the signal detected by the seventh encoder.

The fourth control unit controls the driving of the fourth motor 404M based on the signal detected by the fourth encoder E4, and controls the driving of an eighth motor based on the signal detected by the eighth encoder.

Configuration Example 4

In Configuration Example 4, L, m, and n are 3, 2, and 8, respectively.

In Configuration Example 4, the first encoder E1 and the second encoder E2 are electrically connected to the first signal line S1. The signal detected by the first encoder E1 and the signal detected by the second encoder E2 flow through the first signal line S1.

The third encoder E3, the fourth encoder E4, and the fifth encoder E5 are electrically connected to the second signal line S2. The signal detected by the third encoder E3, the signal detected by the fourth encoder E4, and the signal detected by the fifth encoder E5 flow through the second signal line S2.

The sixth encoder E6, the seventh encoder, and the eighth encoder are electrically connected to the third signal line S3. The signal detected by the sixth encoder E6, the signal detected by the seventh encoder, and the signal detected by the eighth encoder flow through the third signal line S3.

The first control unit 201 controls the driving of the first motor 401M based on the signal detected by the first encoder E1, controls the driving of the third motor 403M based on the signal detected by the third encoder E3, controls the driving of the fifth motor 405M based on the signal detected by the fifth encoder E5, and controls the driving of the seventh motor based on the signal detected by the seventh encoder.

The second control unit 202 controls the driving of the second motor 402M based on the signal detected by the second encoder E2, controls the driving of the fourth motor 404M based on the signal detected by the fourth encoder E4, controls the driving of the sixth motor 406M based on the signal detected by the sixth encoder E6, and controls the driving of the eighth motor based on the signal detected by the eighth encoder.

Although the robot, the control device, and the robot system according to the invention have been described above based on the embodiments shown in the drawings, the invention is not limited to the embodiments. The configuration of each part can be replaced with any configuration having a similar function. Moreover, any other components may be added thereto.

Moreover, the invention may be a combination of any two or more of the configurations (features) of the embodiments and the configuration examples.

Moreover, in the invention, each of the motors is not limited to the servomotor, and examples thereof include, for example, a stepping motor.

Moreover, an encoder is used as each of the position detecting units in the embodiments, but the position detecting unit is not limited to this in the invention. For example, various types of other sensors that detect the rotation angle of the axis of rotation (rotating axis) of a rotor of a motor or a speed reducer, such as a resolver or a potentiometer, may be used. Moreover, various types of sensors that detect the rotational speed of the axis of rotation of a rotor of a motor or a speed reducer, such as a tachogenerator, may be used. When a stepping motor is used as a motor, the rotation angle or rotational speed of the rotor of the motor may be detected by, for example, measuring the number of drive pulses input to the stepping motor.

Moreover, the number of rotating axes of the robot arm is six in the embodiments, but the number of rotating axes of the robot arm is not limited to this in the invention and may be, for example, three, four, five, or seven or more. That is, the number of arms (links) is six in the embodiments, but the number of arms is not limited to this in the invention and may be, for example, three, four, five, or seven or more. For example, by adding an arm between the second arm and the third arm in the robot of the embodiments, a robot in which the number of arms is seven can be realized.

Moreover, the number of robot arms is one in the embodiments, but the number of robot arms is not limited to this in the invention and may be, for example, two or more. That is, the robot (robot main body) may be, for example, a multi-arm robot such as a dual-arm robot.

Moreover, a hand is exemplified as an end effector in the embodiments, but the end effector is not limited to this in the invention. Examples thereof include, for example, a drill, a welding machine, and a laser radiator other than the end effector.

Moreover, the fixing place of the base of the robot is a ceiling in the embodiments, but the fixing place is not limited to this in the invention. Examples thereof include, for example, a floor, a wall, a work table, and the ground in the installation space. Moreover, the robot may be installed in a cell. In this case, the fixing place of the base is not particularly limited, and examples thereof include, for example, a ceiling portion, a wall portion, a work table, and a floor of the cell.

Moreover, the surface to which the robot (base) is fixed is a plane (surface) parallel to the horizontal plane in the embodiments, but the surface is not limited to this in the invention. For example, the surface may be a plane (surface) inclined with respect to the horizontal plane or vertical plane, or may be a plane (surface) parallel to the vertical plane. That is, the first rotating axis may be inclined with respect to the vertical direction or horizontal direction, or may be parallel to the horizontal direction.

Moreover, the first arm and the second arm can overlap as viewed in the axial direction of the second rotating axis in the embodiments, but the invention is not limited to this. The overlapping of the first arm and the second arm may be impossible as viewed in the axial direction of the second rotating axis.

Moreover, the robot may be another type of robot in the invention. As a specific example, for example, a legged walking (running) robot including a leg portion can be stated.

The entire disclosure of Japanese Patent Application No. 2015-183744, filed Sep. 17, 2015 is expressly incorporated by reference herein.

What is claimed is:

1. A robot comprising:
a plurality of arms including first, second, and third arms, a total number of the plurality of arms being n, the first, second, and third arms being rotatable around first, second, and third axes, respectively;
a plurality of motors that respectively drive the plurality of arms, a total number of the plurality of motors being n, each motor being respectively provided in a corresponding one of the plurality of arms, the plurality of motors including first, second, and third motors, the first, second, and third motors driving the first, second, and third arms, respectively;
a plurality of encoders that respectively detect positions of the plurality of arms so as to provide detection signals, a total number of the plurality of encoders being n, each encoder being respectively provided in a corresponding one of the plurality of arms, the plurality of encoders including first, second, and third encoders, the detection signals including first, second, and third position detection signals, the first, second, and third encoders detecting the positions of the first, second, and third arms so as to provide the first, second, and third position detection signals, respectively;
a plurality of signal lines through which the detection signals detected by the plurality of encoders flow, a total number of the plurality of signal lines being L, the plurality of signal lines including first and second signal lines; and
a plurality of controllers that are configured to receive the position detection signals via the plurality of signal lines so as to control driving of the plurality of motors, a total number of the plurality of controllers being m, the plurality of controllers including first and second controllers,
wherein $2 \leq L < n$ and $2 \leq m < n$,
wherein the first and second position detection signals flow only through the first signal line, and the third position detection signal flows only through the second signal line, and
the first and third position detection signals are received only by the first controller so that the first controller is configured to control the driving of the first and third motors, and the second position detection signal is received only by the second controller so that the second controller is configured to control the driving of the second motor.

2. The robot according to claim 1, wherein the first controller and the second controller are connected in parallel.

3. The robot according to claim 1, wherein a difference of the number of the plurality of motors between one controller of the plurality of controllers that is configured to control the driving of a maximum number of the plurality of motors by receiving the detection signals through one single line of the plurality of lines and another controller of the plurality of controllers that is configured to control the driving a minimum number of the plurality of motors by receiving the detection signals through another single line of the plurality of lines is one or zero.

4. The robot according to claim 1, wherein the L, the m, and the n are 2, 3, and 6, respectively.

* * * * *